SIGNAL PROCESSING ARRANGEMENT

Filed Nov. 8, 1956 2 Sheets-Sheet 1

INVENTORS:
DONALD H. KUHN,
MAJOR A. JOHNSON,
BY Michael Masnik
THEIR AGENT.

INVENTORS:
DONALD H. KUHN,
MAJOR A. JOHNSON,
BY Michael Masnik
THEIR AGENT.

United States Patent Office 2,858,435
Patented Oct. 28, 1958

2,858,435

SIGNAL PROCESSING ARRANGEMENT

Donald H. Kuhn, North Syracuse, and Major A. Johnson, East Syracuse, N. Y., assignors to General Electric Company, a corporation of New York Application November 8, 1956, Serial No. 621,980

14 Claims. (Cl. 250—27)

Our invention relates to signal processing arrangements and more particularly to an arrangement for controllably time delaying electrical signals.

It is oftentimes desirable in the electrical arts to time delay a plurality of signals by the same amount. One method heretofore employed makes use of individual time delay circuits associated with each signal. This approach has not been too successful in that it has been difficult to fabricate a plurality of time delaying circuits exhibiting the same electrical characteristics. Furthermore, during operation, temperature effects cause the individual delay circuits to undergo a change in their time delaying characteristic. Furthermore, where a plurality of signals are involved, use of separate time delaying circuits for each signal introduces operational problems and limitations due to bulk, space configuration, etc.

It is therefore an object of our invention to provide an improved signal processing arrangement.

It is a further object of our invention to provide an improved time delaying circuit for time delaying a plurality of signals by the same amount.

It is a further object of our invention to provide an arrangement for time delaying a plurality of signals by the same predetermined amount with a minimum of circuitry.

It is a further object of our invention to use common circuitry for time delaying a plurality of signals.

It is a further object of our invention to provide improved moving target indication of detected, remote objects.

It is a further object of our invention to provide an improved moving target indication apparatus for pulse type radar systems.

In a particular embodiment of this invention, there is employed a plurality of individual time delay circuits. A plurality of gating circuits are sequentially operated to cause the plurality of signals to be supplied successively through each of the delay circuits to a respective output channel. The signals delivered to the output channel carry a time delay corresponding to the sum of the delays introduced by the individual time delay circuits.

Figure 1:
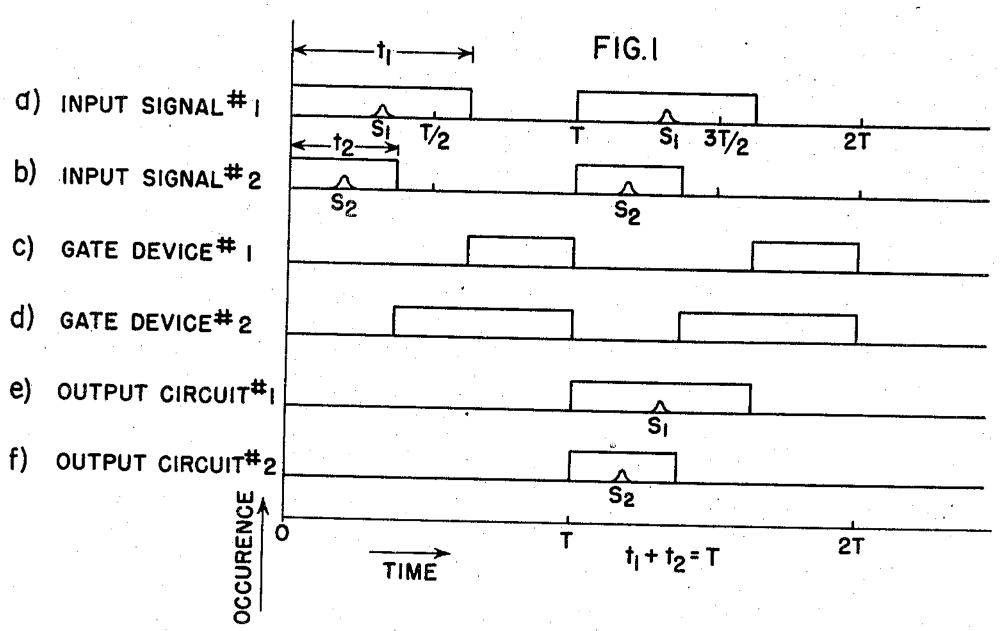
Figure 2A:
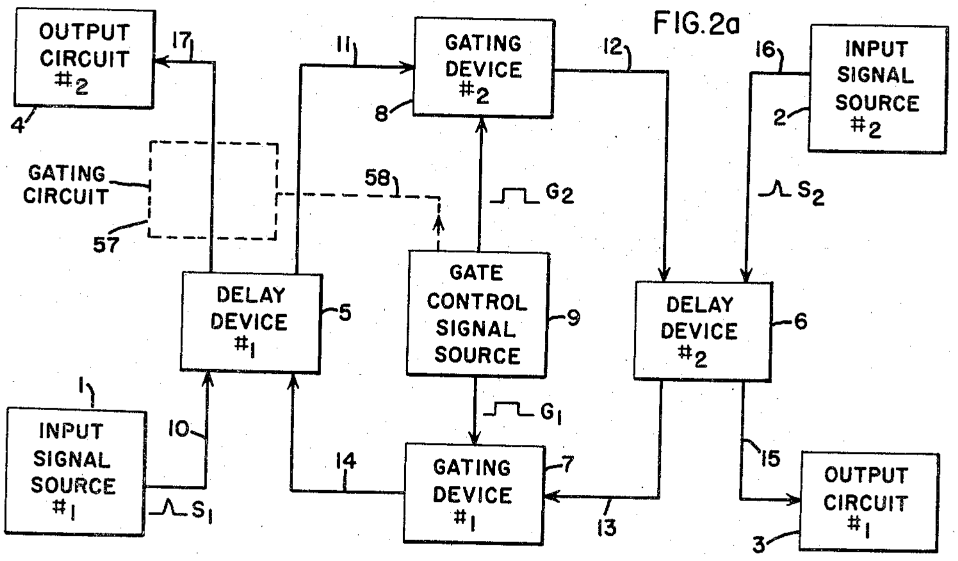
Figure 2B:
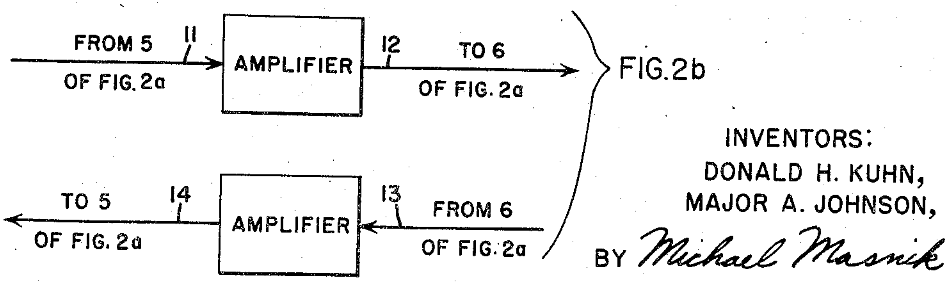
Figure 3:
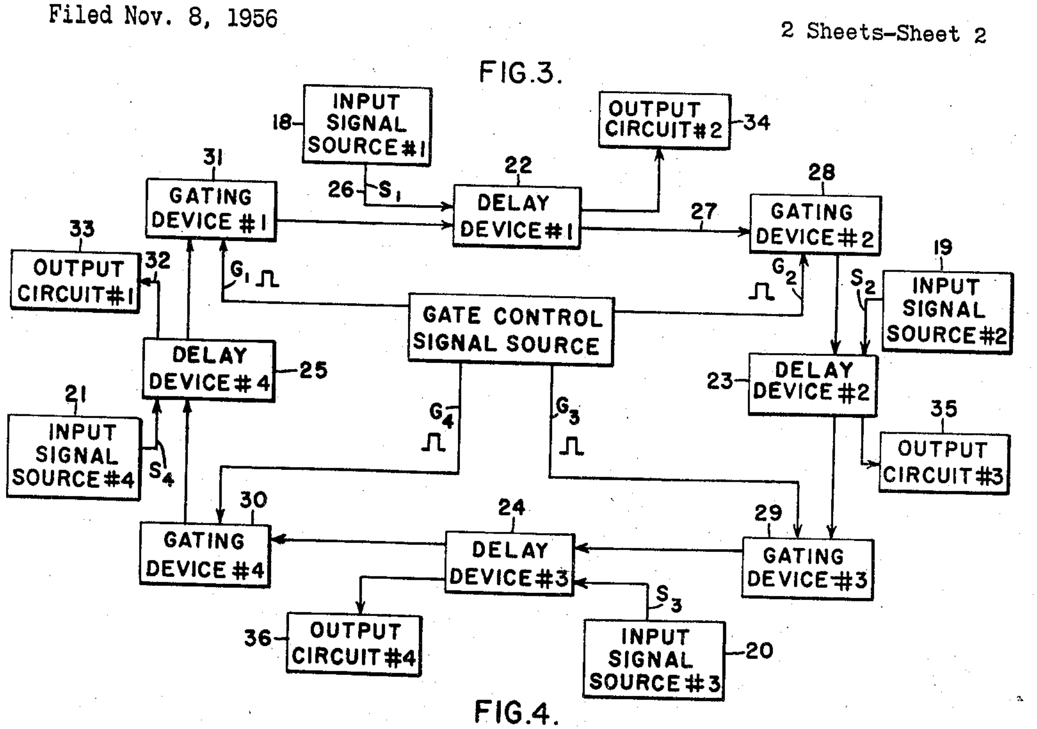
Figures 4, 5:
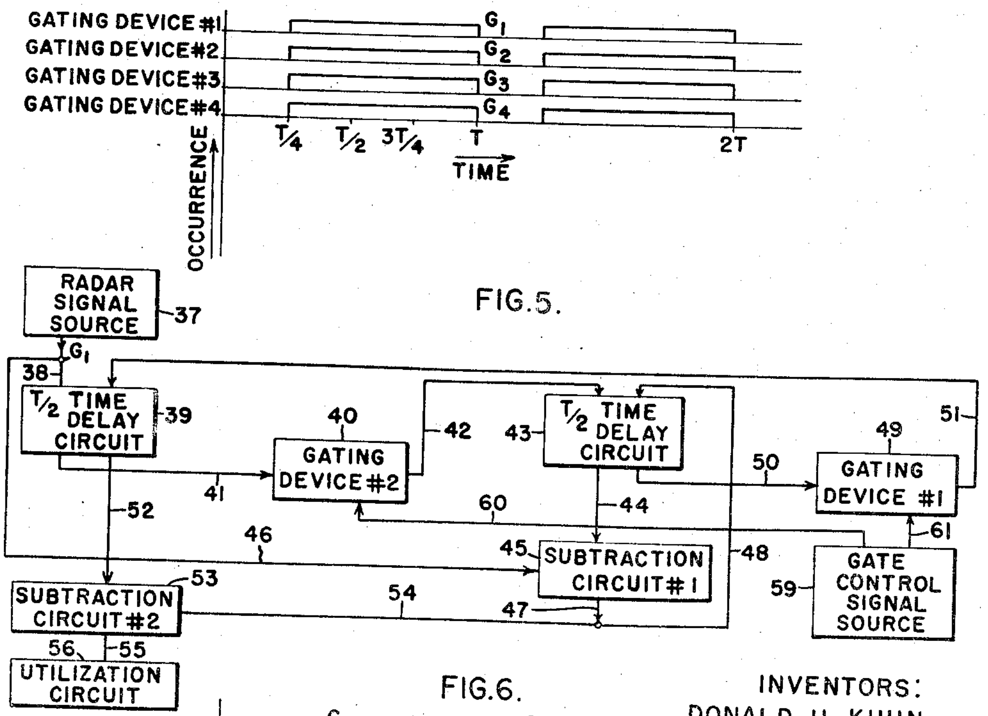
Figure 6:
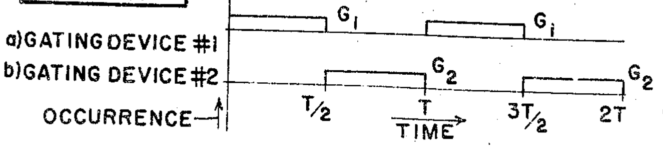

For better understanding of our invention, reference is made to the following description taken in connection with the accompanying drawings and the appended claims wherein Fig. 1 illustrates graphically certain wave forms useful in explaining the principles of the present invention, Fig. 2*a* and Fig. 2*b* illustrate in block diagram form a first embodiment of the invention, Fig. 3 illustrates in block diagram form an extension of the invention processing more than two signals through the same time delay, Fig. 4 illustrates certain wave forms useful in explaining the operation of the arrangement of Fig. 3, Fig. 5 illustrates an application of the present invention to a radar object detection system applying moving target indication principles, and Fig. 6 illustrates wave forms pertinent to the operation of the devices shown in Fig. 5.

Referring to Fig. 1 there is shown wave forms in graphical form in which time is plotted as the abscissa and the occurrence of signals is plotted as the ordinate. Referring in particular to graph A, there is shown a signal S1 occurring any time during the interval of time $t_1$. Graph B illustrates another signal S2 which can occur any time during the time interval $t_2$. Signals S1 and S2 may be radar echoes corresponding to a return of a pulse transmitted from a radar station to a remote object, the time interval between the transmission of the radar pulse and the reception of its echo at a radar receiver providing an indication of range to the remote object.

For purposes of discussion, echoes S1 and S2 correspond to radar echoes available over separate channels. It is desired that the echoes S1 and S2 be time delayed by the same amount, namely for the time period T. As hereinabove mentioned, prior arrangements for time delaying separate signals by the same amount have been relatively difficult to attain.

Fig. 2*a* discloses an arrangement in accordance with the principles of our invention to time delay such signals by the same amount. Input signals corersponding to S1 of Fig. 1 are available from source 1, whereas input signals S2 are available from a source 2. It is desired to take the signal S1 and process it through a time delay of T and deliver it in its delayed form to the output circuit 3. Similarly it is desired to process signal S2 to appear at the output circuit 4 with a time delay of T. To accomplish this, applicants employ time delay circuits 5 and 6 whose time delays aggregate to a time period of T. Depending upon the circuit requirements and the facilities available, delay circuits 5 and 6 may be equal or unequal provided they aggregate to provide the full time delay of T. In order to process the signals S1 and S2 to the full time delay period T, gating circuits 7 and 8 are provided. These gating devices are operated by signals received from the gate control signal source 9 in a manner to sequentially gate the respective signals through the proper time delay circuits to their respective output circuits. Signal S1 is applied directly over lead 10 to delay device 5 whereupon it emerges on lead 11 with a delay corresponding to that introduced by circuit 5. For purposes of explanation, devices 5 and 6 are considered each to produce delays of $t_2$ and $t_1$ respectively. Accordingly S1 appears at lead 11 with a delay of $t_2$.

Gating device 8 is normally inoperative so that it prevents the passage of signals from its input lead 11 to its output lead 12. However, under the control of the gating signal G2 corresponding to Fig. 1*d* from the gate signal source 9, gating device 8 operates to permit passage of the initially delayed signal S1 to its output lead 12. The initially delayed signal S1 is then applied directly through the delay device 6 and emerges at the output lead 13 with a full delay of T. Gating device 7 normally prevents passage of signals from its input lead 13 to its output lead 14. Thus the signal S1 with the full delay of time T is delivered to the output circuit 3 over lead 15. Referring to Fig. 1*c*, it is noted that the signal S1 with the full delay of time T appears at the input to the gating device 7 when no enabling signal G1 is available from the source 9.

The signal S2 is processed in a similar manner through the various common circuits and is similarly delivered to its respective output circuit 4 by way of lead 17 with the full delay of period T. It should be noted that in a manner similar to that explained with respect to gating device 7, the signal S2 after its second delay introduced by device 5 passes directly to lead 17 but is unable to be passed through the device 8 since with its delay of time T it would occur outside the enabling time period of signal G2 supplied by the signal source 9.

It should be noted that the aggregate time delay introduced by circuits 5 and 6 must be equal or less than the recurrence period T of the signals S1 and S2. Also the range of times $t_1$ and $t_2$ during which signals S1 and S2 respectively occur should not aggregate more than the selected aggregate time delay.

It will be noted that signal S1, after passing through delay device 5 will be supplied over lead 17 to output circuit 4 with a time delay of $t_2$. In general, this signal will be superfluous at this output, but in some cases may be undesirable. If such is the case, a gating circuit such as 57 shown in dotted line form may be employed to prevent the passage of signals except in response to signals available over lead 58 from source 9 during the range of time occupied by S2 as indicated in Fig. 1*f*.

In a similar manner, signal S2 will appear at output circuit 3 after a time delay $t_1$ and may be prevented from passing to 3 by suitable gating circuit similar to 57 and 58 which have been previously described.

The gating devices 7 and 8 shown in Fig. 2*a* serve the purpose of preventing the signals from recirculating around the signal path made up of the serially connected delay devices after once having traversed each of the plurality of delay devices. If it is desirable that the signals recirculate as in some signal integrating arrangements, the gates may be replaced by one-way transmission devices such as vacuum tube amplifiers as shown in Fig. 2*b*. Thus, periodic input signals, instead of undergoing a signal time delay T in passing through the delay loop to a respective output circuit, now are recirculated through the same loop to undergo further delays of 2T, 3T, etc. The system will operate stably as long as the total loop gain is less than unity. The amount of resulting integration will depend on the loop gain used.

Fig. 3 shows an embodiment of the present invention wherein a plurality of signals are processed through a common circuitry. Referring to Fig. 3, there are shown a plurality of sources 18, 19, 20 and 21 of input signals S1, S2, S3 and S4. For purposes of simplicity, wherever possible, common reference symbols are employed to describe the elements common to the figures of the drawing. For purposes of simplicity, it shall be assumed that the signals S1, S2, S3 and S4 occur at the same periodicity corresponding to a recurrence period of T, also that the delay devices 22, 23, 24 and 25 introduce respectively time delays of T/4. Signal S1 is applied over lead 26 directly to the delay device 22 whereupon it emerges on lead 27 with a time delay T/4. Gating devices 28, 29, 30 and 31 are normally inoperative to pass signals except for the periods G1, G2, G3 and G4 shown in Fig. 4. Thus, after a time delay of T/4 in device 22, S1 is passed by gating device 28 to delay device 23 whereupon it picks up an additional delay of T/4. Gating device 29 operates during the period G3 to pass the signal S1 with an aggregate delay of T/2 to delay device 24 whereupon the signal S1 picks up an additional time delay of T/4. Gating device 30 operates during the period G4 to pass the signal S1 with an aggregate time delay of 3T/4 to delay device 25 which introduces an additional time delay of T/4. Since device 31 is inoperative when the signal S1 emerges with the full delay of time T, the fully delayed signal is delivered over lead 32 to its respective output circuit 33. In a similar manner, signals S2, 3 and 4 are sequentially processed through the various time delay circuits to emerge at their respective output circuits 34, 35 and 36 with the same time delay of T.

Referring to Fig. 5, there is disclosed an embodiment of the present invention applicable to a radar obstacle detection arrangement. Radar echo signals available from source 37 occur during normal operation only during the portion of the pulse repetition period T. For purposes of our explanation we shall assume that these echoes are received only during a portion of time corresponding to the interval between 0 to T/2. These signals which we shall label S1 are applied over lead 38 to the first time delay circuit 39 which introduces a time delay of T/2. Gating device 40 normally operates to prevent signals applied at its input terminal 41 from being passed to its output lead 42. Gating device 40 operates during the period G2 corresponding to Fig. 6*b* in response to signals on lead 60 from source 59 to pass the signal S1 with a time delay of T/2 over lead 42 to the second time delay circuit 43, whereupon it emerges at lead 44 with a full time delay of period T. The signal S1 with a time delay of T is supplied to the subtraction circuit 45, together with a subsequent signal S1 occurring during the next repetition period, and which is available over lead 46. Subtraction device 45 subtracts one signal from the other and provides the residue over lead 47. This subtracted signal is then applied over lead 48 to the time delay circuit 43, whereupon it again undergoes an additional time delay of T/2. Gating device 49 is normally inoperative to prevent input signals available on its input lead 50 from being applied to its output lead 51. Device 49 operates during the gating period G1 corresponding to Fig. 6*a* in response to signals on lead 61 from source 59 to pass the signal S1 delayed with the period of 3T/2 over lead 51 to the time delay circuit 39 whereupon it emerges on lead 52 with a total time delay of 2T. Subtraction circuit 53 subtracts the signals S1 with a delay of 2T available over lead 52 from the signal S1 available over lead 54 with a time delay of T. The subtracted output is applied over lead 55 to a utilization circuit 56. In this application, a recurrent signal available from a single signal channel is delayed by equal amounts successively to produce delays of T and 2T for a double cancellation moving target indicator.

While specific embodiments have been shown and described, it will of course be understood that various modifications may yet be devised by those skilled in the art which will embody the principles of the invention and found in the true spirit and scope thereof.

What I claim and desire to secure by Letters Patent of the United States is:

1. An arrangement for time delaying a plurality of applied signals by the same amount comprising first and second recurrent signals, first means to time delay an applied signal by $n$T, where $n$ is any fraction less than 1 and T is a desired total time delay, second means to time delay an applied signal by $(1-n)$T, means for successively and separately applying each of said first and second signals to each of said delay means during non-overlapping portions of a period of time T, output circuits for each of said signals, and means for applying said delayed first and second signals to respective ones of said output circuits.

2. In combination, a source of first signals, a source of second signals, first means to time delay an applied signal by $n$T where $n$ is any fraction less than 1 and T is a desired total time delay, second means to time delay an applied signal by $(1-n)$T, means for applying said first and second signals to each one of said time delay means during non-overlapping portions of a period of time T, respective output circuits for each of said first and second signals, and means for applying each of said first and second signals after undergoing a total time delay of T in passage through said delay means to respective ones of said output circuits.

3. A source of first and second input signals, first and second output circuits, first and second time delay devices, first and second gating devices, a source of gate control signals, means for applying each of said input signals through a respective one of said delay devices to undergo an incremental time delay, said gating devices responsive to signals from said gate control signal source for applying each of said incrementally delayed first and second signals to the other of said delay devices for undergoing a further time delay, and said gating devices responsive to signals from said gate control signal source for applying each of said further delayed signals to respective ones of said output circuits.

4. A source of a plurality of input signals, a plurality of output circuits, a plurality of time delay devices, a plurality of gating devices, a source of gate control signals, said gating devices responsive to signals from said gate control signal source for successively and separately applying each of said input signals to each of said delay devices during non-overlapping periods of time to undergo a cumulative time delay, said gating devices responsive to signals from said gate control signal source for applying said cumulatively time delayed signals to respective ones of said output circuits.

5. In combination, a source of a plurality of input signals occurring during a given time interval no greater in duration than an aggregate desired total time delay, a plurality of output circuits, a plurality of time delay devices each dimensioned to provide an incremental time delay, which incremental time delays aggregate to said desired total time delay, means for applying each of said input signals succesively and separately to each of said time delay devices during non-overlapping time periods to cause each of said input signals to undergo said total time delay, and means for applying each of said input signals time delayed by said total time delay to respective ones of said output circuits.

6. An arrangement for time delaying a plurality of applied signals by the same amount comprising first and second periodic signals, first means to time delay an applied signal by $n$T, where $n$ is any fraction less than 1 and T is a time equal to the period of said periodic signals, second means to time delay an applied signal by $(1-n)$T, means for successively and separately applying each of said first and second signals to each of said delay means during said time period T, output circuits for each of said signals, and means for applying said delayed first and second signals to respective ones of said output circuits.

7. In combination, a source of first recurrent signals, a source of second recurrent signals having the same recurrence as said first signal, first means to time delay an applied signal by $n$T where $n$ is any fraction less than 1 and T is time period of said recurrence total time delay, second means to delay an applied signal by $(1-n)$T, means for applying said first and second input signals to each one of said time delay means during non-overlapping portions of said period of time T, respective output circuits for each of said first and second signals, and means for applying said first and second signals after undergoing a time delay of T in passage through said delay means to respective ones of said output circuits.

8. A source of first and second periodic input signals, first and second output circuits, first and second time delay devices, first and second gating devices, a source of gate control signals, means for applying each of said input signals through a respective one of said delay devices to undergo an incremental time delay, said gating devices responsive to signals from said gate control signal source for applying each of said incrementally delayed first and second signals to the other of said delay devices for undergoing a further time delay, and said gating devices responsive to signals from said gate control signal source for applying each of said further delayed signals to respective ones of said output circuits.

9. A source of a plurality of input signals of the same periodicity but capable of different time occurrence, a plurality of output circuits, a plurality of time delay devices, a plurality of gating devices, a source of gate control signals, said gating devices responsive to signals from said gate control signal source for successively and separately applying each of said input signals to different ones of said delay devices during non-overlapping periods of time to undergo a cumulative time delay, said gating devices responsive to signals from said gate control signal source for applying said cumulatively time delayed signals to respective ones of said output circuits.

10. In combination, a source of a plurality of input signals of the same periodicity but capable of different time occurrences, a plurality of output circuits, a plurality of time delay devices each dimensioned to provide an incremental time delay, which incremental time delays aggregate to a desired total time delay, means for applying each of said input signals successively and separately to each of said time delay devices during non-overlapping portions of a period of time equal to the period of said periodicity to cause each of said input signals to undergo said desired total time delay, and means for applying each of said input signals time delayed by said desired total time delay to respective ones of said output circuits.

11. A source of periodic signals having a period T, means for time delaying a signal from said source occurring during a first period by a time T, means for subtracting from each other said first period signal delayed with a time T and a signal from said source occurring during a second period to derive a first difference signal, means for time delaying said first difference signal by a time T, means for delaying a signal from said source occurring during a second period by a time T, means for obtaining a signal indicative of the difference between said delayed second period signal and a signal occurring during a third period to derive a second difference signal, and means for obtaining a signal representative of the difference between said first difference signal with time delay T and said second difference signal, and means for utilizing said last-named difference signal.

12. A source of periodic signals of period T, a first time delay device introducing an incremental time delay to applied signals, a second time delay circuit introducing an incremental time delay to applied signals, said incremental time delays aggregating to a total time delay of period T, means for applying a signal from said source occurring during a first period through said first time delay device to undergo a first incremental time delay, means for successively applying a signal from said source occurring during a first period through each of said delay devices to obtain a first period signal with a time delay T, means for deriving a signal representative of the difference between a signal from said source occurring during a second period and said first period signal with time delay T to derive a first difference signal, means for applying said first difference signal and a signal from said source occurring during a second period successively and separately through each of said time delay devices during the same single period of time T to obtain a first difference signal delayed by a time T and a second period signal with a time delay T, means for deriving a signal representing the difference between a signal from said source occurring during a third period and said second period signal with time delay T to derive a second difference signal, and means for deriving the difference between said delayed first difference signal and said second difference signal to produce a third difference signal, and a utilization circuit responsive to said third difference signal.

13. A source of signals, means for time delaying a signal from said source occurring during a first period of time by a time T, means for subtracting said first period signal delayed with a time T and a signal from said source occurring during a second period from one another to provide a first difference signal, means for time delaying said first difference signal by a time T, means for delaying a signal from said source occurring during a second period of time by a time T, means for providing a signal indicative of the difference between said delayed second period signal and a signal occurring during a third period to derive a second difference signal, and means for providing a second difference signal representative of the difference between said time delayed first difference signal and said second difference signal, and means for utilizing said second difference signal.

14. A source of periodic signals of period T, a first time delay device for delaying an applied signal by a time $n$T where $n$ is any fraction less than 1, a second time delay device for delaying an applied signal by a time $(1-n)T$, means for successively applying a signal from said source occurring during a first period to said first and second time delay device to obtain a first signal with a time delay T, means for applying a signal from said source occurring during a first period through each of said delay devices to obtain a first period signal with a time delay T, means for deriving a first signal representative of the difference between a signal from said source occurring during a second period and said first period signal with time delay T, means for applying said first difference signal and a signal from said source occurring during a second period successively and separately through each of said time delay devices during a single time period T to obtain a first difference signal delayed by a time T and a signal from said source occurring during the second period with a time delay T, means for deriving a second signal representing the difference between a signal from said source occurring during a third period and said time delayed second period signal, and means for subtracting said time delayed first difference signal and said second difference signal to produce a third difference signal, and a utilization circuit responsive to said third difference signal.

References Cited in the file of this patent

UNITED STATES PATENTS 2,659,079 Cunningham ---------- Nov. 10, 1953
2,746,033 Bachmann ------------ May 15, 1956